(12) United States Patent
Lee et al.

(10) Patent No.: US 9,058,050 B2
(45) Date of Patent: Jun. 16, 2015

(54) CLOCK-BASED SOFT-START CIRCUIT AND POWER MANAGEMENT INTEGRATED CIRCUIT DEVICE

(71) Applicant: Samsung Electronics Co., Ltd., Suwonsi (KR)

(72) Inventors: Kyoung-Jin Lee, Seoul (KR); Hee-Mun Bang, Seoul (KR); Hyoung-Seok Oh, Gyeongbuk (KR); Je-Hyung Yoon, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 208 days.

(21) Appl. No.: 13/713,615

(22) Filed: Dec. 13, 2012

(65) Prior Publication Data

US 2013/0265807 A1 Oct. 10, 2013

(30) Foreign Application Priority Data

Apr. 6, 2012 (KR) ........................ 10-2012-0036041

(51) Int. Cl.
*H02M 1/36* (2007.01)
*G05F 1/46* (2006.01)
*H02M 3/157* (2006.01)

(52) U.S. Cl.
CPC ...................................... *G05F 1/468* (2013.01)

(58) Field of Classification Search
CPC ............. H02M 2001/0041; H02M 2001/0025; H02M 1/36

USPC .............................. 323/283, 288, 901; 363/49
See application file for complete search history.

(56) References Cited

U.S. PATENT DOCUMENTS

| | | | |
|---|---|---|---|
| 6,969,977 | B1 | 11/2005 | Smith |
| 7,541,795 | B1 * | 6/2009 | Smith et al. .................... 323/285 |
| 8,030,978 | B2 * | 10/2011 | Tseng ............................ 327/142 |
| 8,890,501 | B2 * | 11/2014 | Evans et al. .................... 323/284 |
| 2004/0022078 | A1 | 2/2004 | Shieh |
| 2004/0228152 | A1 | 11/2004 | Solie |

FOREIGN PATENT DOCUMENTS

| | | |
|---|---|---|
| JP | 2004023948 | 1/2004 |
| JP | 2010104140 | 5/2010 |
| KR | 20070118752 | 12/2007 |

* cited by examiner

*Primary Examiner* — Gary L Laxton
(74) *Attorney, Agent, or Firm* — Onello & Mello, LLP

(57) ABSTRACT

In a clock-based soft-start circuit configured to generate a soft-start reference voltage that restrains an inrush current at an initialization of power supplied to a DC-DC converter, the clock-based soft-start circuit comprises a time setting unit configured to set a soft-start time period in response to a clock signal. A ramp circuit is configured to generate a soft-start reference voltage which is ramped upward or downward between a base level and a reference voltage level during the soft start time period set by the time setting unit. In this manner, the clock-based soft-start circuit is applicable for all DC-DC converters and the soft-start in a linear slope is possible.

19 Claims, 11 Drawing Sheets

CLOCK-BASED SOFT-START CIRCUIT AND POWER MANAGEMENT INTEGRATED CIRCUIT DEVICE

CROSS-REFERENCE TO RELATED APPLICATION

This application claims priority under 35 USC §119 to Korean Patent Application No. 10-2012-0036041, filed on Apr. 6, 2012, in the Korean Intellectual Property Office (KIPO), the contents of which are herein incorporated by reference in their entirety.

BACKGROUND

1. Technical Field

Example embodiments relate generally to a soft-start circuit and a power management integrated circuit device, and, more particularly, to an integrated circuit which supports a soft-start scanning test in an initial stage for restraining inrush current when a DC-DC converter initializes.

2. Description of the Related Art

In recent years, as mobile apparatus such as smart phones, tablet computers, and the like, continue to become increasingly popular, the demand for effective power management in such devices continues to increase. Accordingly, Power Management Integrated Circuit Devices (PMIC), responsible for managing power in mobile devices, are receiving attention.

At the same time, as the display panels of mobile devices become larger in size and produce images at high-definition resolutions, power consumption is increased, and available battery time of the smart phone is reduced. Thus, the reduction of power consumption and increase of power efficiency are key factors in PMIC design.

Since the mobile display panel requires a power source having a high driving voltage and high power efficiency, an analog regulator such as a conventional low dropout regulator may not be used, so it has become common to employ a charge pump or a step-up/down inverting/non-inverting DC-DC converter.

In the case of a converter, such as a DC-DC converter using a high-capacitance filter capacitor, if an output voltage is increased at a rapid speed during an initial start-up operation, an inrush current, which is greater than a reference current by several tens of times, may flow therethrough to charge the filter capacitor in a relatively short time period. Thus, the initial inrush current must be suitably controlled to prevent the inner blocks of the integrated circuit from receiving stress by limiting the current or the voltage using a soft-start scheme.

Although the conventional soft-start can be simply implemented by using the charge and discharge of the capacitor, a predictable soft-start time characteristic may not be achieved when the soft-start time is controlled for a long time (>1 ms) or when a target output voltage is changed. Further, in the case of the charge and discharge of the capacitor, although a ramp-up soft-start is possible, the timing control for the soft start is very difficult in the case of the ramp-down due to the natural discharge characteristics of the capacitor.

In other schemes, if the soft-start time characteristics are controlled using a clock, the soft-start time control can be achieved for a relatively long time. However, since an internal reference clock is used, the number of counter bits must be increased when the time for the timing control is needed to be lengthened, so the chip size may be enlarged or current consumption may be increased by virtue of the large counter size.

SUMMARY

Some example embodiments provide a clock-based soft-start power management integrated circuit device which can be simply used for all types of DC-DC converters without the requirements for additional circuitry.

Some example embodiments provide a clock-based soft-start circuit which has linear ramp up/ramp down characteristics and which can be digitally controlled.

Some example embodiments provide a clock-based soft-start circuit capable of performing a ramp-up/down regardless of voltage headroom.

According to example embodiments, there is provided a clock-based soft-start circuit which includes a time setting unit and a ramp circuit for generating a soft-starting reference voltage to restrain an inrush current occurring at an initial stage of power supply to a DC-DC converter.

As a result, embodiments provide for a clock-based soft-start power management integrated circuit device that is able to control simply and linearly the ramp-up/down operation without increasing chip size by controlling the ramp-up/down of the output current according to a clock count value. As a result, the device can be simply used for all DC-DC converters without the requirements for additional circuitry.

In aspects of the present inventive concepts, a clock-based soft-start circuit is configured to generate a soft-start reference voltage that restrains an inrush current at an initialization of power supplied to a DC-DC converter, the clock-based soft-start circuit comprising: a time setting unit configured to set a soft-start time period in response to a clock signal; and a ramp circuit configured to generate a soft-start reference voltage which is ramped upward or downward between a base level and a reference voltage level during the soft start time period set by the time setting unit.

In some embodiments, the time setting unit comprises: a counter to which a delayed clock signal is input, the counter configured to count the soft-start time period; and a soft-start time stopper configured to shut off the input of the delayed clock signal to the counter when the soft-start time period has been reached.

In some embodiments, the ramp circuit comprises: a voltage buffer configured to generate a reference current in response to a reference voltage applied to an input of the voltage buffer; and a current digital-to-analog converter configured to generate a ramp current which is ramped upward or downward in units of the reference current in response to an output of the counter, and configured to convert the ramp current into a ramp voltage to output the soft-start reference voltage.

In some embodiments, the voltage buffer comprises: a differential amplifier configured to differentially amplify the reference voltage and a first feedback voltage; and a reference current source configured to generate the reference current in response to an output of the differential amplifier, the first feedback voltage being provided from the reference current source to the differential amplifier in response to the reference current.

In some embodiments, the current digital-to-analog converter comprises: a plurality of current sources, each of which generates a mutually-different current as a multiple of two relative to, and in response to, the reference current; a plurality of switches, each connected to a respective one of the current sources, the switches corresponding to a plurality of binary outputs of the counter, respectively, each of the plurality of switches being activated in response to a corresponding output; and an output unit that receives the mutually-different currents, which are supplied through the switches, to generate the soft-start reference voltage.

In some embodiments, the DC-DC converter is a non-inverting type, and wherein each of the plurality of current sources includes PMOS transistors which have mutually-different aspect ratios as a multiple of two, and is ramped up from a zero voltage level serving as the base level.

In some embodiments, the DC-DC converter is an inverting type, and wherein each of the plurality of current sources includes NMOS transistors which have mutually-different aspect ratios as a multiply of two, and is ramped down from a high voltage level serving as the base level.

In some embodiments, the clock-based soft-start circuit further comprises an initial down current source configured to provide an initial down current to the output unit for accelerating an initial ramp-down when the base level is the high voltage level and an output voltage of the DC-DC converter is positive.

In some embodiments, the clock-based soft-start circuit further comprises a comparator that compares the soft-start reference voltage with a second feedback voltage from an output terminal of the DC-DC converter to generate an initial reference voltage.

In aspects of the present inventive concepts, a power management integrated circuit device comprises: an error amplifier configured to compare a reference voltage with a feedback voltage generated by dividing an output voltage of a DC-DC converter, to generate an error voltage; a pulse width controller configured to generate a pulse-width control signal of a switching device of the DC-DC converter in response to the error voltage; and a clock-based soft-start circuit configured to generate a soft-start reference voltage which is ramped up or down in response to a clock signal when power is initially supplied.

In some embodiments, the DC-DC converter is a non-inverting type, and wherein the clock-based soft-start circuit includes PMOS transistors, each transistor sequentially generating a mutually-different current as a multiple of two relative to, and in response to, a reference current for ramping up the soft-start reference voltage from a base level in a substantially linear manner.

In some embodiments, the DC-DC converter is an inverting type, and wherein the clock-based soft-start circuit includes a plurality of NMOS transistors, each transistor for sequentially generating a mutually-different current as a multiple of two relative to, and in response to, a reference current for ramping down the soft-start reference voltage from a base level in a substantially linear manner.

In some embodiments, the clock-based soft-start circuit further includes an initial down current source configured to provide an initial down current to accelerate an initial ramp-down when the base level is a high voltage level and an output voltage of the DC-DC converter is positive.

In some embodiments, the power management integrated circuit device further comprises a comparator configured to compare the feedback voltage fed back from the output terminal of the DC-DC converter with the soft-start reference voltage to generate an initial reference voltage.

In aspects of the present inventive concepts, a clock-based soft-start circuit in a DC-to-DC converter, comprises: a binary counter that is activated to count clock cycles during a soft-start time period, the binary counter having a plurality of output bits corresponding to binary values; and a ramp circuit that generates a soft-start reference voltage that ramps upward or downward in response to the plurality of output bits of the binary counter, the ramp circuit including a plurality of transistors having current driving parameters that correspond to binary values, current paths of the plurality of transistors being activated in response to the plurality of output bits of the binary counter.

In some embodiments, the clock-based soft-start circuit further comprises an output unit that combines a plurality of currents flowing through the current paths of activated ones of the plurality of transistors to generate a combined current and that converts the combined current to the soft-start reference voltage.

In some embodiments, the clock-based soft-start circuit further comprises a plurality of switches that selectively activate the plurality of current paths in response to states of the plurality of output bits of the binary counter.

In some embodiments, the transistors are PMOS or NMOS transistors.

In some embodiments, the soft-start reference voltage ramps upward or downward in a substantially linear manner.

In some embodiments, the binary counter is selectively activated over the soft-start time period during which the soft-start reference voltage ramps upward or downward between a base level and a reference voltage level.

The effects of example embodiments are not limited to the above, but any other effects not described herein will be understood to those skilled in the art to be within the scope of the present inventive concepts.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF EMBODIMENTS

Figure 1:
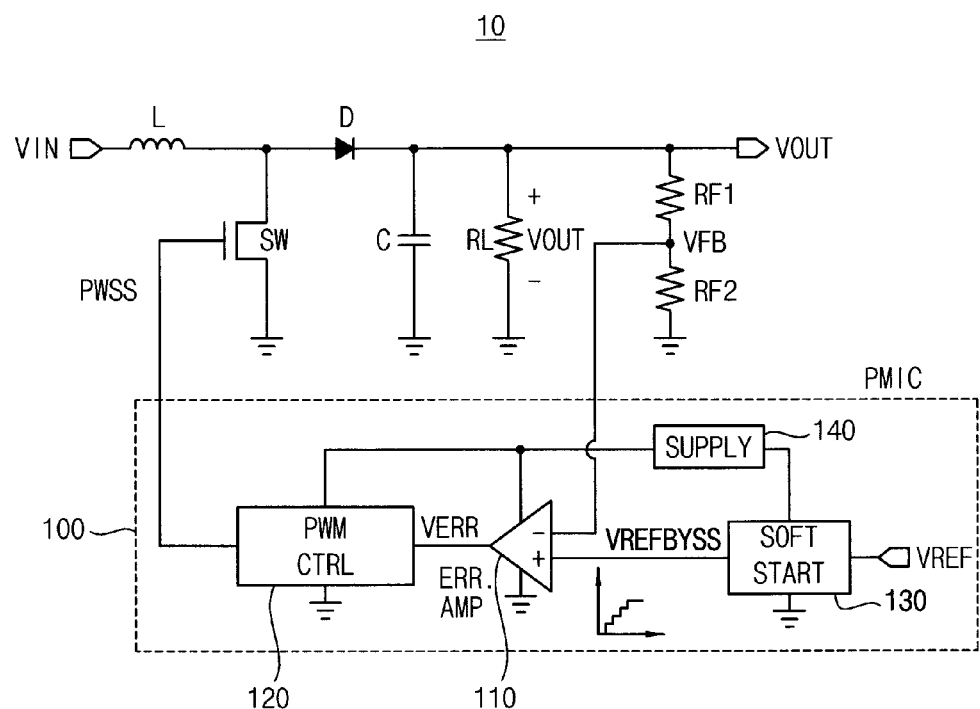
FIG. 1 is a circuit diagram illustrating a non-inverting boost DC-DC converter employing a clock-based soft-start power management integrated circuit device according to example embodiments.

Various example embodiments will be described more fully hereinafter with reference to the accompanying drawings, in which some example embodiments are shown. The present inventive concepts may, however, be embodied in many different forms and should not be construed as limited to the example embodiments set forth herein. Rather, these example embodiments are provided so that this disclosure will be thorough and complete, and will fully convey the scope of the present inventive concepts to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be teemed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be described with reference to accompanying drawings. The same reference numerals will be used to refer to the same elements throughout the drawings and detailed description about the same elements will be omitted in order to avoid redundancy.

FIG. 1 is a circuit diagram illustrating a non-inverting boost DC-DC converter employing a clock-based soft-start power management integrated circuit device according to example embodiments.

Referring to FIG. 1, in the non-inverting boost DC-DC converter 10, when a switching transistor SW is turned on, a DC input voltage VIN charges a choke coil L through a current path formed by the choke coil L and the switching transistor SW, and when the switching transistor SW is turned off, a capacitor C is charged with the DC input voltage VIN as well as a voltage VL which is the voltage charged in the choke coil L through a current path formed by the choke coil L, a diode D and the capacitor C. The switching transistor SW is switch-driven at a high frequency, for example at a frequency of several decades of KHz, by a pulse-width control signal output by a Power Management Integrated Circuit (PMIC) 100. A signal charged across the capacitor C is output through an output resistor RL as a DC output voltage VOUT. The DC output voltage VOUT is divided by a feedback voltage divider including resistors RF1 and RF2, and a divided voltage is applied to the PMIC 100 as a feedback voltage VFB.

The PMIC 100 includes an error amplifier 110, a pulse width controller 120, a clock-based soft-start circuit 130 and a power supply 140. The power supply 140 provides a driving voltage to the error amplifier 110, the pulse width controller 120 and the clock-based soft-start circuit 130. The error amplifier 110 compares a soft-start reference voltage VREFBYSS with the feedback voltage VFB to generate an error voltage VERR. In response to the error voltage VERR provided from the error amplifier 110, the pulse width controller 120 generates a pulse width switching signal PWSS and applies the pulse width switching signal PWSS to the gate of the switching transistor SW. When a reference voltage VREF is input to the clock-based soft-start circuit 130, the clock-based soft-start circuit 130 counts a clock signal at initialization, or start-up, to generate the soft-start reference voltage VREFBYSS which is ramped up in an increasing manner. Since the power source 140 uses an LDO (low dropout) positive driving voltage, a divided voltage obtained by dividing the feedback voltage can be used. Thus, in this manner, the PMIC 100 soft-starts at an initial stage by slowly ramping up the output voltage from the zero voltage level serving as a base level to a target voltage level, and controls a pulse width of a high frequency signal with which the switching transistor SW is driven, such that the level of the output voltage VOUT follows the level of the reference voltage VREF.

Figure 2:
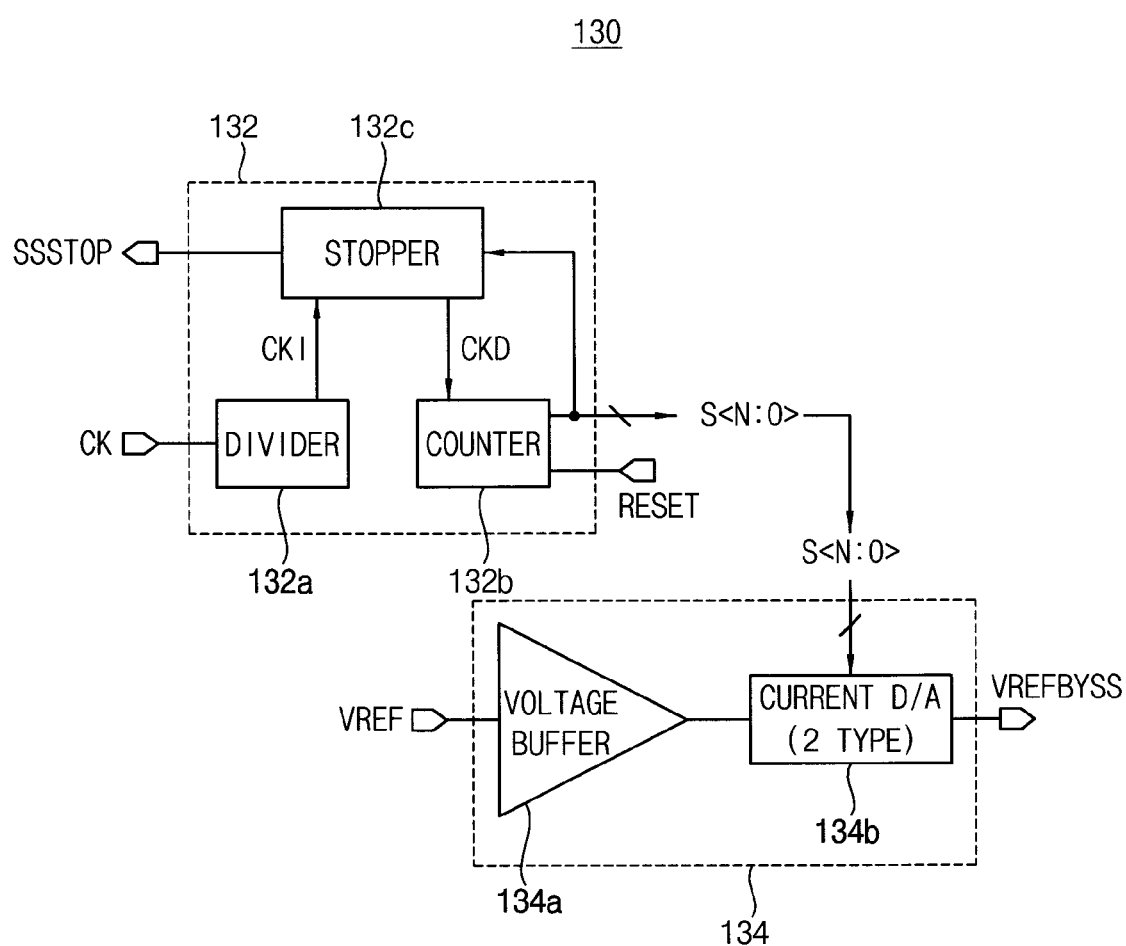
FIG. 2 is a block diagram illustrating the clock-based soft-start circuit of FIG. 1 according to example embodiments.
Figure 3:
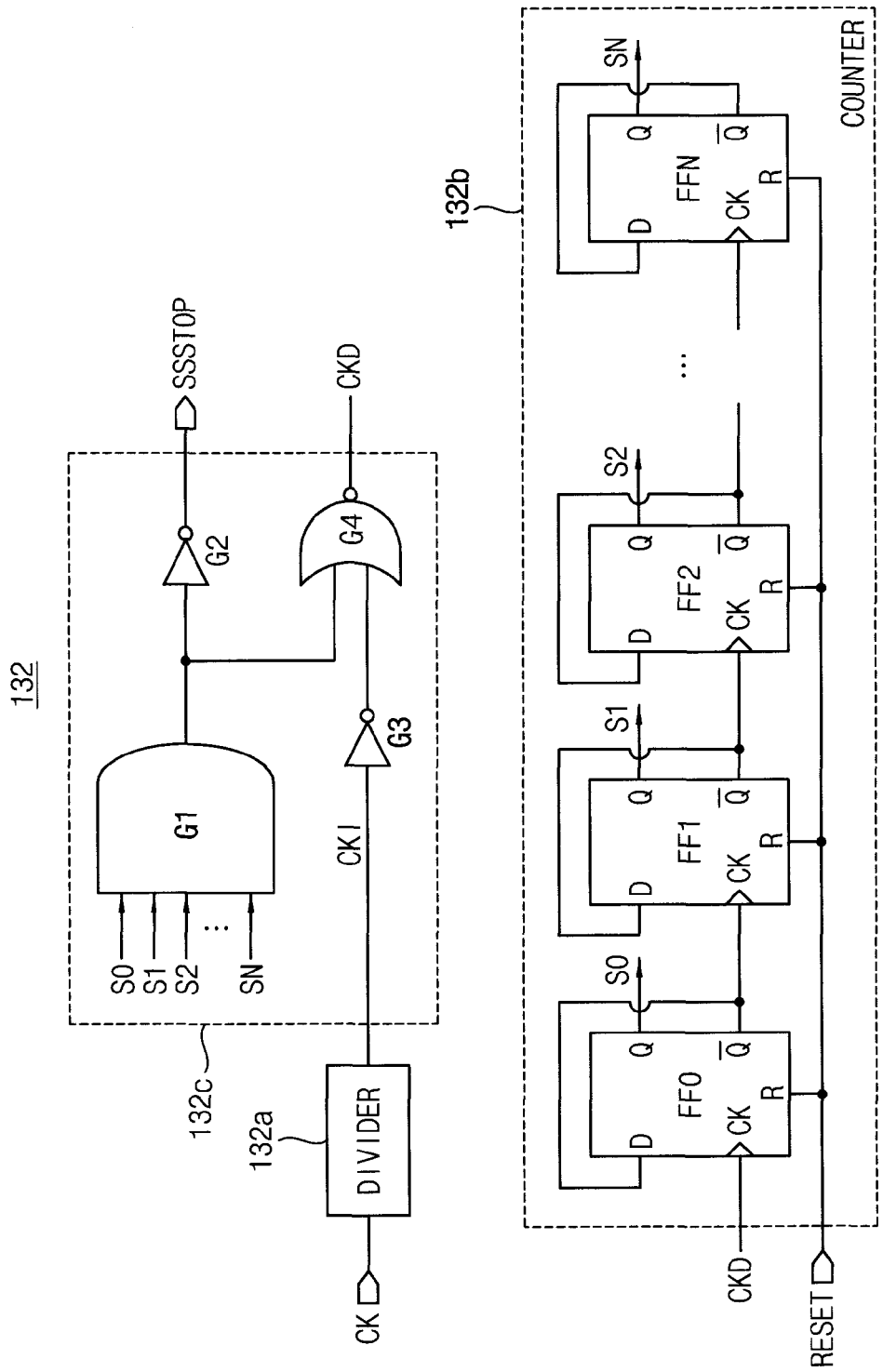
FIG. 3 is a detailed circuit diagram of the time-setting unit of FIG. 2 according to example embodiments.
Figure 4:
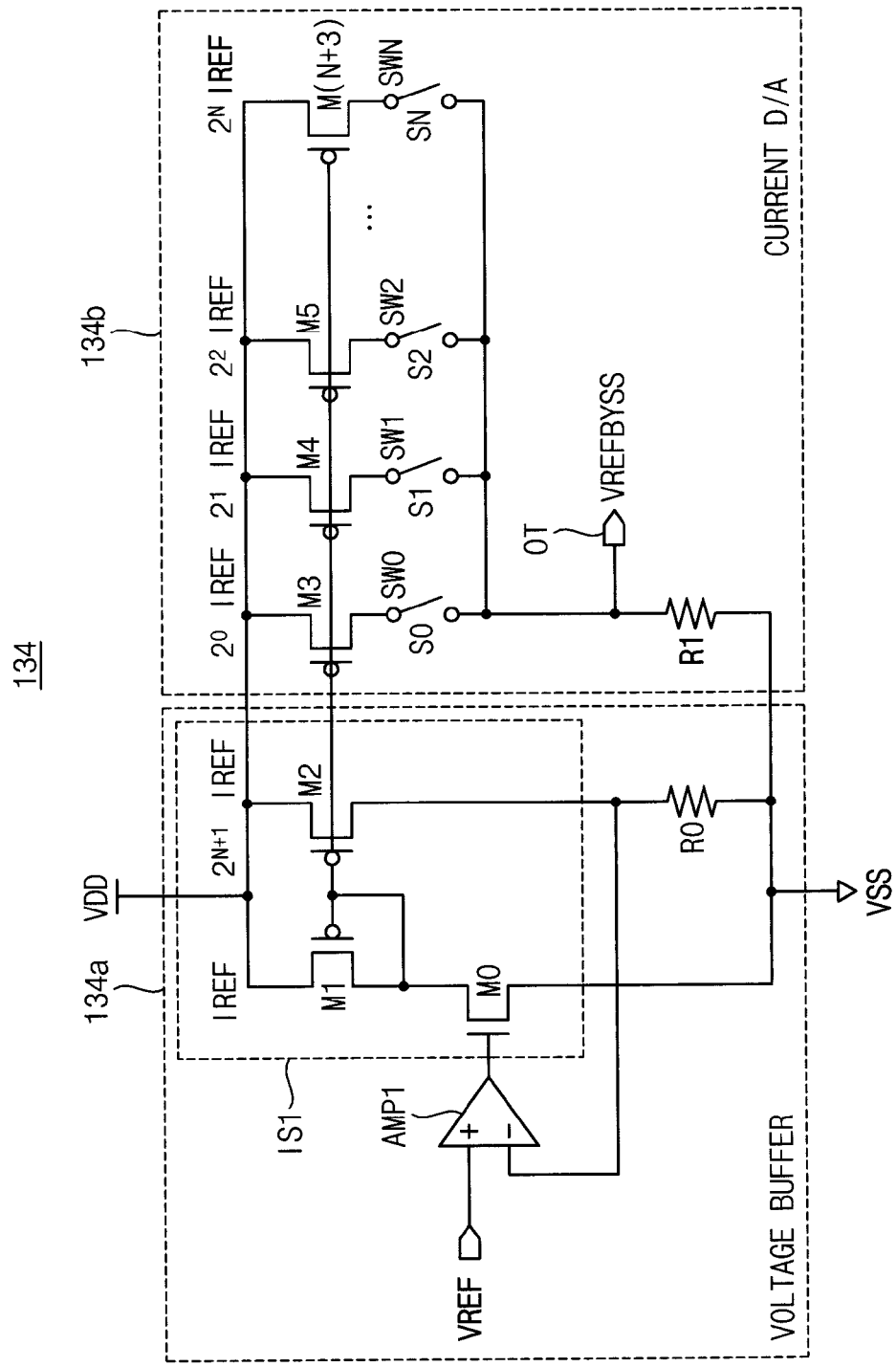
FIG. 4 is a detailed circuit diagram of the ramp circuit of FIG. 2 according to example embodiments.

FIG. 2 is a block diagram illustrating the clock-based soft-start circuit in accordance with the embodiment illustrated in FIG. 1, FIG. 3 is a detailed circuit diagram of a time setting unit of FIG. 2 according to example embodiments, and FIG. 4 is a detailed circuit diagram of a ramp circuit of FIG. 2 according to example embodiments.

Referring to FIGS. 2 through 4, the clock-based soft-start circuit 130 includes a time setting unit 132 for setting a soft start time in response to a clock signal and a ramp circuit 134 for generating a soft-start reference voltage which is raised up or lowered down to a set reference voltage for the time period set by the time setting unit 132.

Referring to FIGS. 2 and 3, the time setting unit 132 includes a divider 132a, a counter 132b, and a soft-start stopper 132c.

The divider 132a divides a clock signal CK to generate a divided clock signal CKI. The divider 132a may set the ramp up slope control in response to the frequency of the clock signal CK.

In some embodiments, the counter 132b can be implemented using a binary counter. In some embodiments, the binary counter includes N+1 flip-flops FF0~FFN connected in series to each other. In each of the N+1 flip-flops FF0~FFN, outputs of positive output terminals Q are provided as digit output signals S0~SN, and a negative output terminal QB of a given flip-flop is connected to a clock terminal of a next flip-flop in the series. The counter 132b counts delayed clock signal CKD and generates the N+1 digit outputs S<N:0> where S<N:0> denotes the binary digit outputs S0~SN. Other counter configurations are equally applicable to the principles of the present inventive concepts.

In some embodiments, the soft-start stopper 132c includes an AND gate G1, a NOR gate G4, and two inverters G2 and G3. The N+1 digit outputs S<N:0> are input to the AND gate G1, and the output of the AND gate G1 is output through the inverter G2 as a soft-start end signal SSSTOP. That is, in the present example embodiment, when all of the inputs are high, a logic state of the soft-start end signal SSSTOP is transitioned, for example from high to low. The divided clock signal CKI is input through the inverter G3 to one input terminal of the NOR gate G4, and the output of the AND gate G1 is input to the other input terminal of the NOR gate G4. The output of the NOR gate G4 is provided to the counter 132b as the delayed clock signal CKD. Thus, when the output of the AND gate G1 is high, the NOR gate G4 cuts off the delayed clock signal CKD, and, when the output of the AND gate G1 is low, the NOR gate G4 allows the delayed clock signal CKD to pass therethrough. The N+1 digit outputs S<N:0> are input to the soft-start stopper 132c, and the state of the soft-start stopper 132c controls the supply of the divided clock signal CKI as the delayed clock signal CKD to the counter 132b.

That is, in the present embodiment, when the N+1 digit outputs S<N:0> are all in high states, this condition is determined as the soft-start end time and the supply of the delayed clock signal CKD is halted, or otherwise cut off. Thus, since the clock signal is not provided to the counter 132b, the counter 132 remains in the last counting state. The counter 132b can be reset in response to a reset signal RESET when power is supplied to the device.

Referring to FIGS. 2 and 4, the ramp circuit 134 includes a voltage buffer 134a and a current digital-to-analog (DA) converter 134b.

In the present example embodiment, the voltage buffer 134a includes a differential amplifier AMP1, a current source IS1 and a resistor R0. The current source IS1 includes p-channel metal-oxide semiconductor (PMOS) transistors M1 and M2 and an n-channel metal-oxide semiconductor (NMOS) transistor M0. A reference voltage VREF is applied to a positive input terminal of the differential amplifier AMP1. The transistors M1 and M0 are connected in series to each other between a high level power supply voltage VDD and a low level power supply voltage VSS. The output of the differential amplifier AMP1 is applied to the gate of the transistor M0 and the gate of the transistor M1 is connected to the drain of transistor M1 that is, the transistor M1 is diode-connected. The transistor M2 and the resistor R0 are connected in series to each other between the high level power supply voltage VDD and the low level power supply voltage VSS. The gates of the transistors M1 and M2 are commonly connected so that the resulting circuit constitutes a current mirror. Thus, due to the current mirror configuration, an output current $2^{N+1}$IREF is generated, which is determined by the aspect ratio (channel width/length) of the transistor M2 with respect to the reference current IREF limited by the aspect ratio of the transistor M1. The common connection node of the transistor M2 and the resistor R0 is connected to the negative input terminal of the differential amplifier AMP1. Thus, the voltage fed back to the negative input terminal of the differential amplifier AMP1 is obtained from $2^{N+1}$IREF and R0.

The current DA converter 134b includes the N+1 PMOS transistors M3 to M(N+3), switches SW0 to SWN and a load resistor R1. The N+1 switches SW0 to SWN are correspondingly connected in series to the N+1 PMOS transistors M3 to M(N+3), respectively. The series connection pairs of the N+1 PMOS transistors M3 to M(N+3) and switches SW0 to SWN are connected in parallel between the high level power supply voltage VDD and the output terminal OT. The gates of the PMOS transistors M3 to M(M+3) are commonly connected to the gate of the transistor M1 in the form of current mirrors. The sizes of the transistor M1 and the PMOS transistors (current sources) M3 to M(N+3) are designed to have the aspect ratios corresponding to the current ratios of $2^0$IREF: $2^1$IREF:$2^2$IREF:....:$2^{N+1}$IREF. That is, the PMOS transistors (current sources) M3 to M(N+3) sequentially generates mutually-different currents $2^0$IREF, $2^1$IREF, $2^2$IREF:....:$2^{N+1}$ IREF as a multiple of two in response to the reference current IREF. The switches SW0 to SWN are respectively switched in a manner that corresponds to the N+1 digit outputs S0 to SN of the counter 132b. The load resistor (or output unit) R1 is connected between the output terminal OT and the low level power supply voltage VSS.

Therefore, the current flowing through the load resistor R1 is equal to the sum of currents flowing through the PMOS transistors M3 to M(N+3) which are connected to the switches which are turned on in response to the output signal of the counter. That is, the current DA converter 134b generates a ramp current which is ramped up or down in units of a reference current IREF in response to the output of the counter 132b, converts the ramp current into a ramp voltage to output the soft-start reference VREFBYSS voltage which is ramped up or down between the base level and the reference voltage level.

The reference current IREF may be expressed as following Equation 1:

$$VREF = M \times (2^{N+1})IREF \times R0 = (2^0 + 2^1 + + 2^N)IREF \times MR1 \quad \text{[Equation 1]},$$

In above equation, M denotes a proportional coefficient of the current $(2^{N+1})$IREF of the current source IS1 and the total current $(2^0 + 2^1 + \ldots + 2^N)$IREF of the current DA converter 134b.

Accordingly, if the load resistor R1 is increased M times instead of reducing the total current of the current DA converter 134b by M times lower than the current of the current source IS1, the amount of current consumed can be reduced. Further, if the reference voltage VREF is designed based on the size of the transistors M5 or M6, other than the transistor M3, not only can the amount of consumed current be reduced, but also the area of the active regions occupied by the transistors may be reduced approximately by ¼ or ⅛.

Figure 5:
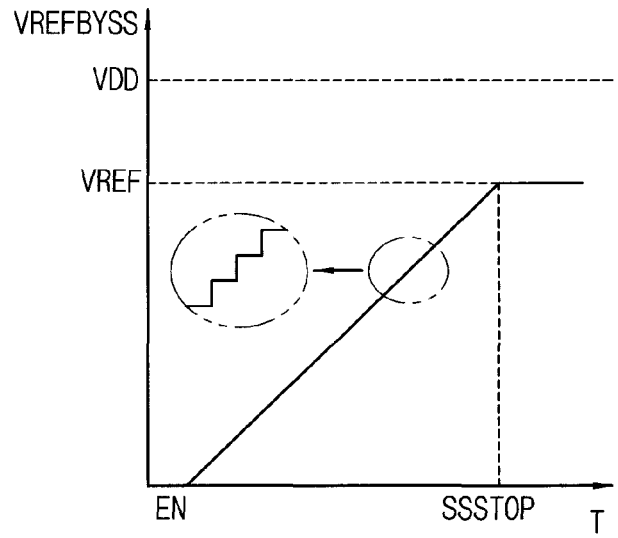
FIG. 5 is a graph illustrating the output characteristic of the ramp circuit in FIG. 4.

FIG. 5 is a graph illustrating the output characteristics of the clock-based ramp circuit in accordance with the embodiment depicted in FIG. 4.

Referring to FIG. 5, the voltage signal output through the output terminal OT of the clock-based soft start circuit 130, that is, the soft-start reference voltage VREFBYSS may have the swing range of 0 [V] to VDD−VREF [V]. That is, voltage signal output through the output terminal OT of the ramp circuit 134, that is, the soft-start reference voltage VREFBYSS is ramped up in a substantially linear manner from 0 [V] in response to an enable signal EN to reference voltage VREF level in response to the soft-start end signal SSSTOP. Thus, various reference voltages may be set in the swing range. Therefore, without the requirement for an additional amplifier or clamp circuit, the reference voltage may be simply matched with the output voltage range of the converter, so that a power circuit for a mobile display may be readily implemented.

That is, according to exemplary embodiments, a soft-start slope control and a soft-start time set can be controlled in a relative simple fashion, and in a digital configuration through a clock frequency control, a time set by a counter, a current value control and the like while minimizing current consumption. At the same time, these advantages are accomplished while minimizing chip real estate or active region area occupied by the circuit.

Figure 6:
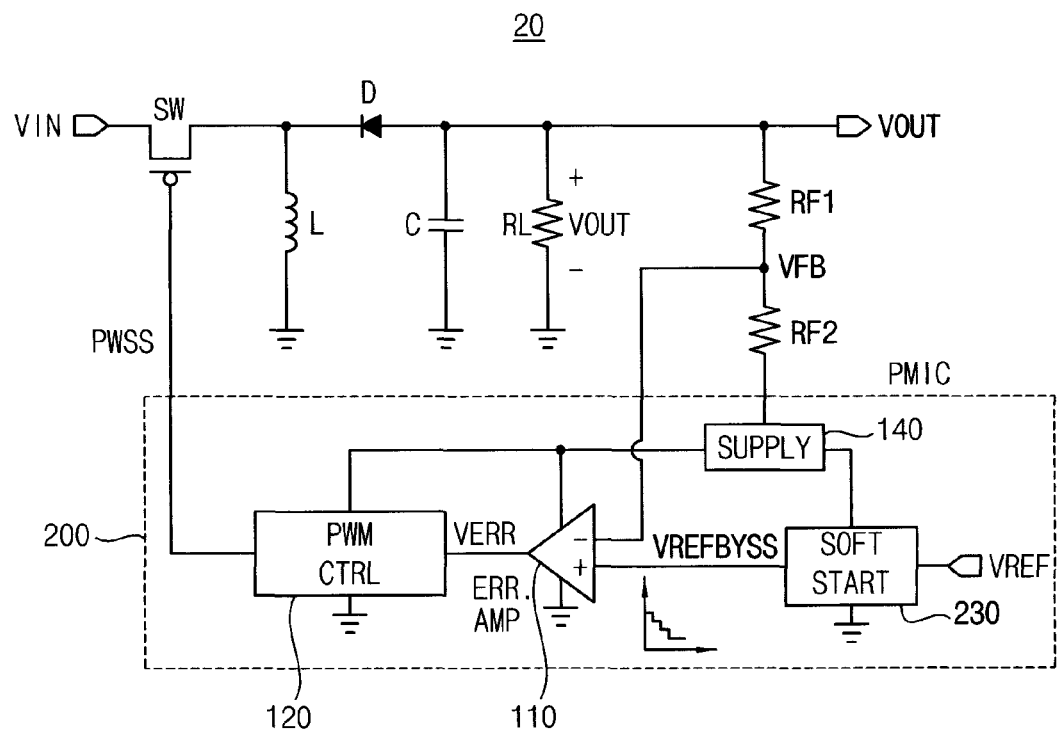
FIG. 6 is a circuit diagram illustrating an inverting buck-boost DC-DC converter using a clock-based soft-start power management integrated circuit device according to another example embodiment.
Figure 7:
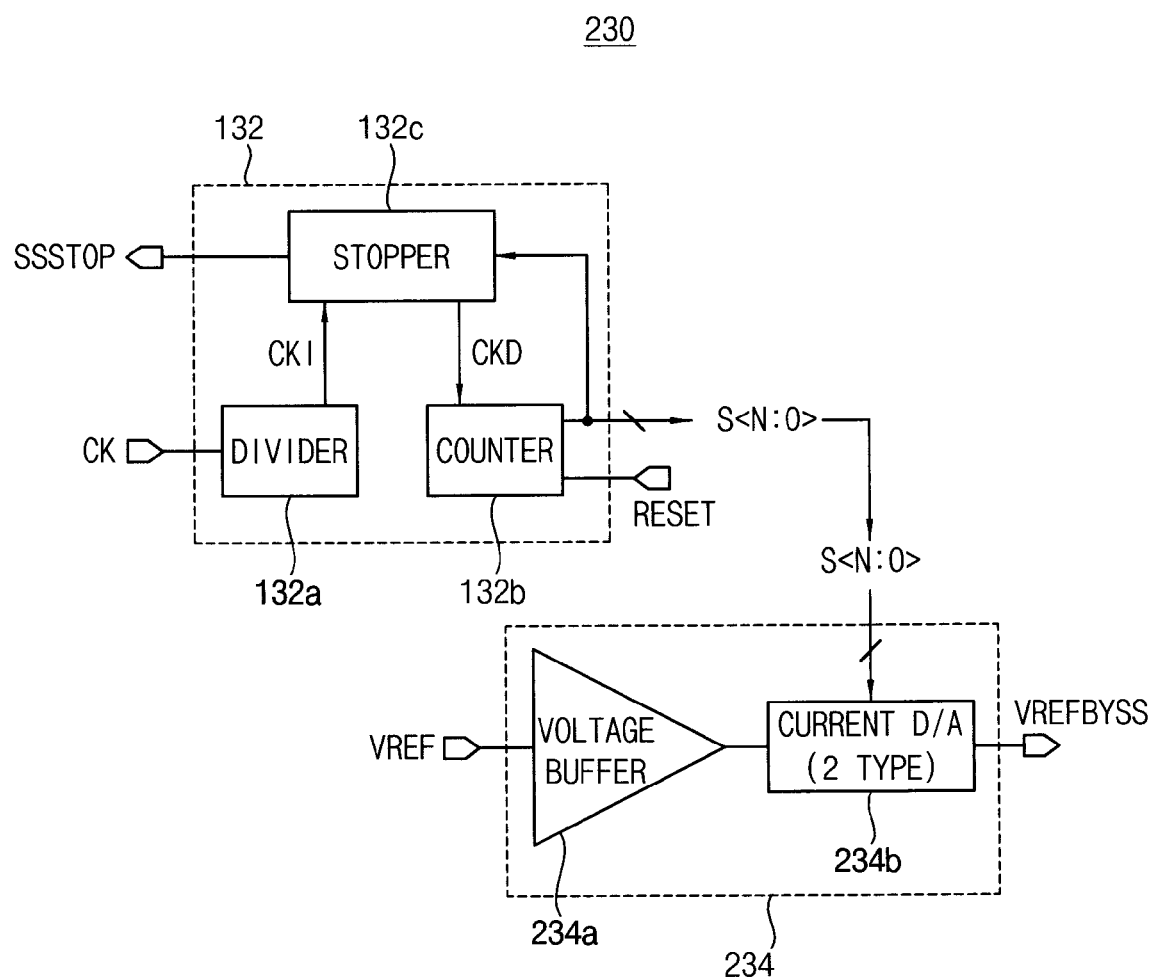
FIG. 7 is a block diagram illustrating the clock-based soft-start circuit of FIG. 6 according to example embodiments.
Figure 8:
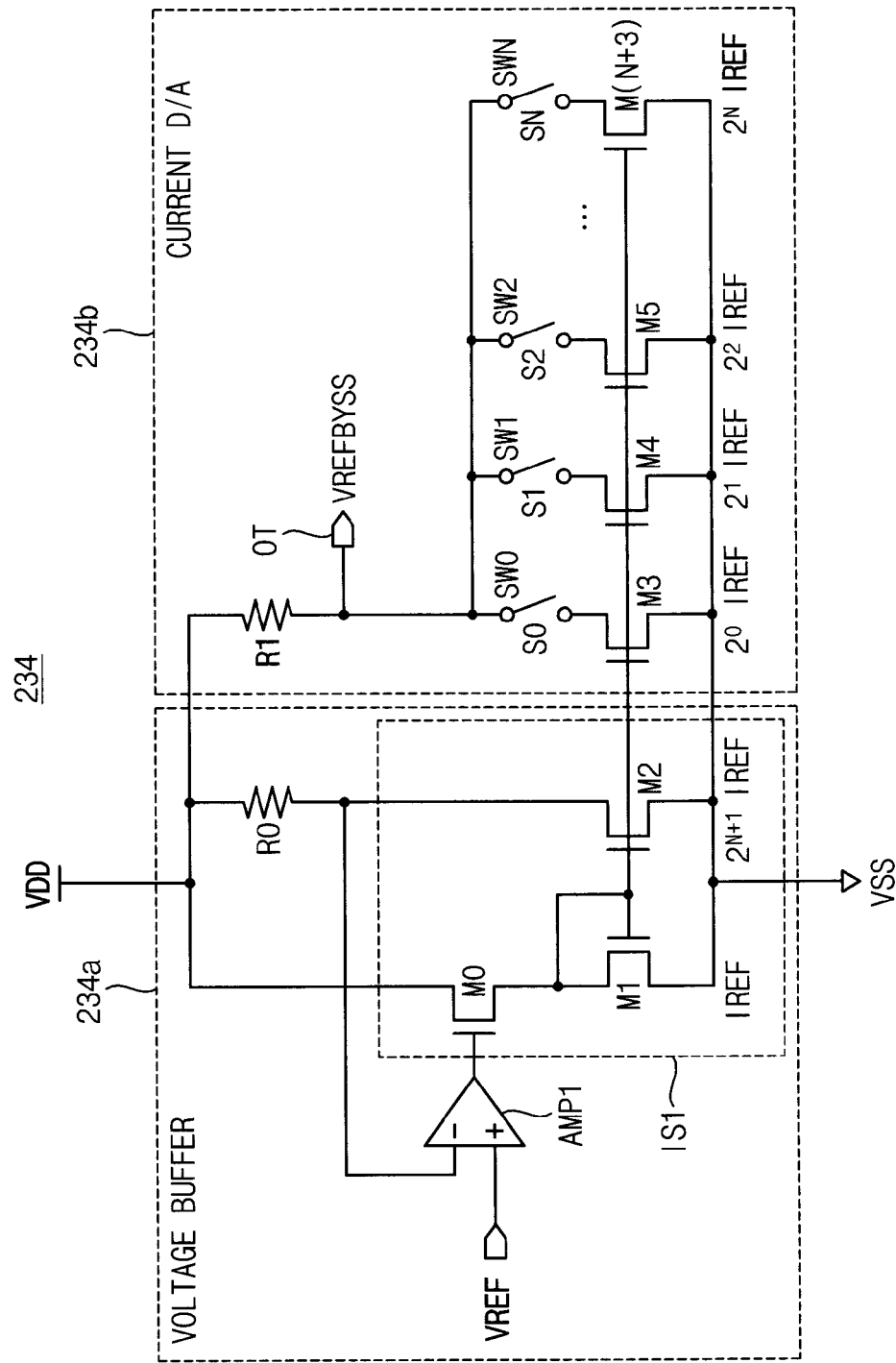
FIG. 8 is a detailed circuit diagram illustrating the ramp circuit of FIG. 7 according to example embodiments.

FIG. 6 is a circuit diagram illustrating an inverting buck-boost DC-DC converter using a clock-based soft-start power management integrated circuit device according to another example embodiment, FIG. 7 is a block diagram illustrating a clock-based soft-start circuit in the embodiment of FIG. 6 and FIG. 8 is a detailed circuit diagram illustrating a ramp circuit of the embodiment of FIG. 7 according to example embodiments.

Referring to FIGS. 6 through 8, as compared with the above-described non-inverting boost DC-DC converter 10, the inverting buck-boost DC-DC converter 20 is different in connection structure, or, in other words, different in the manner in which the choke coil L, a switching transistor SW and a diode D are connected. That is, in the present embodiment of FIG. 6, when the switching transistor SW is turned on, a DC input voltage VIN charges the choke coil L through a current path formed by the choke coil L and the switching transistor SW, and when the switching transistor SW is turned off, a voltage VL charged in the choke coil L charges a capacitor C through a current path formed by the choke coil L, the ground voltage, a capacitor C and the diode D. The switching transistor SW is switch-driven at a high frequency of several decades of KHz with a pulse width control signal output by a PMIC 200. A signal charged in the capacitor C is similarly output through an output resistor RL as a negative DC output voltage VOUT. The negative DC output voltage VOUT is divided by a feedback voltage divider including resistors RF1 and RF2, and a divided voltage is applied to the PMIC 200 as a feedback voltage VFB. The feedback voltage divider RF1 and RF2 may be connected in series between a converter output terminal and a high-level power supply 140 of the PMIC 200. Thus, the feedback voltage VFB is generated as a positive voltage.

In the PMIC 200, since an error amplifier 110, a pulse width controller 120 and a power supply 140 are the same as those of the embodiment described above with the exception of an inner structure of the clock-based soft-start circuit 230, the same reference numerals are used and further detailed descriptions thereof will not be repeated in connection with the present embodiment.

The clock-based soft-start circuit 230 is equal to that of the embodiment of FIGS. 1-4 except for a ramp circuit 234; accordingly, the same reference numerals are used and the detailed descriptions thereof will not be repeated in connection with the present embodiment.

Referring to FIG. 8, the ramp circuit 234 of the present embodiment includes a voltage buffer 234*a* having an NMOS current sink and a current DA converter 234*b*. As compared to the voltage buffer 134*a* and the current DA converter 134*b*, of the embodiment of FIGS. 1-4, the voltage buffer 234*a* and the current DA converter 234*b* of the present embodiment are configured by interchanging the NMOS transistors and the PMOS transistors.

Figure 9:
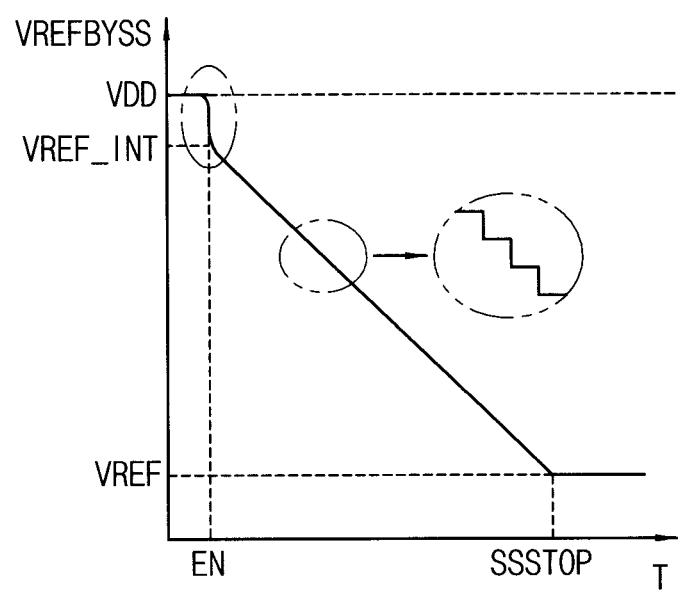
FIG. 9 is a graph illustrating the output characteristic of the ramp circuit of FIG. 7.

FIG. 9 is a graph illustrating the output characteristics of clock-based soft start circuit of FIG. 7. Referring to FIG. 9, when power is applied to the circuit, the voltage of the output terminal OT, that is, the soft-start reference voltage VREFBYSS is ramped down in a substantially linear manner from the VDD level to the VREF level.

Figure 10:
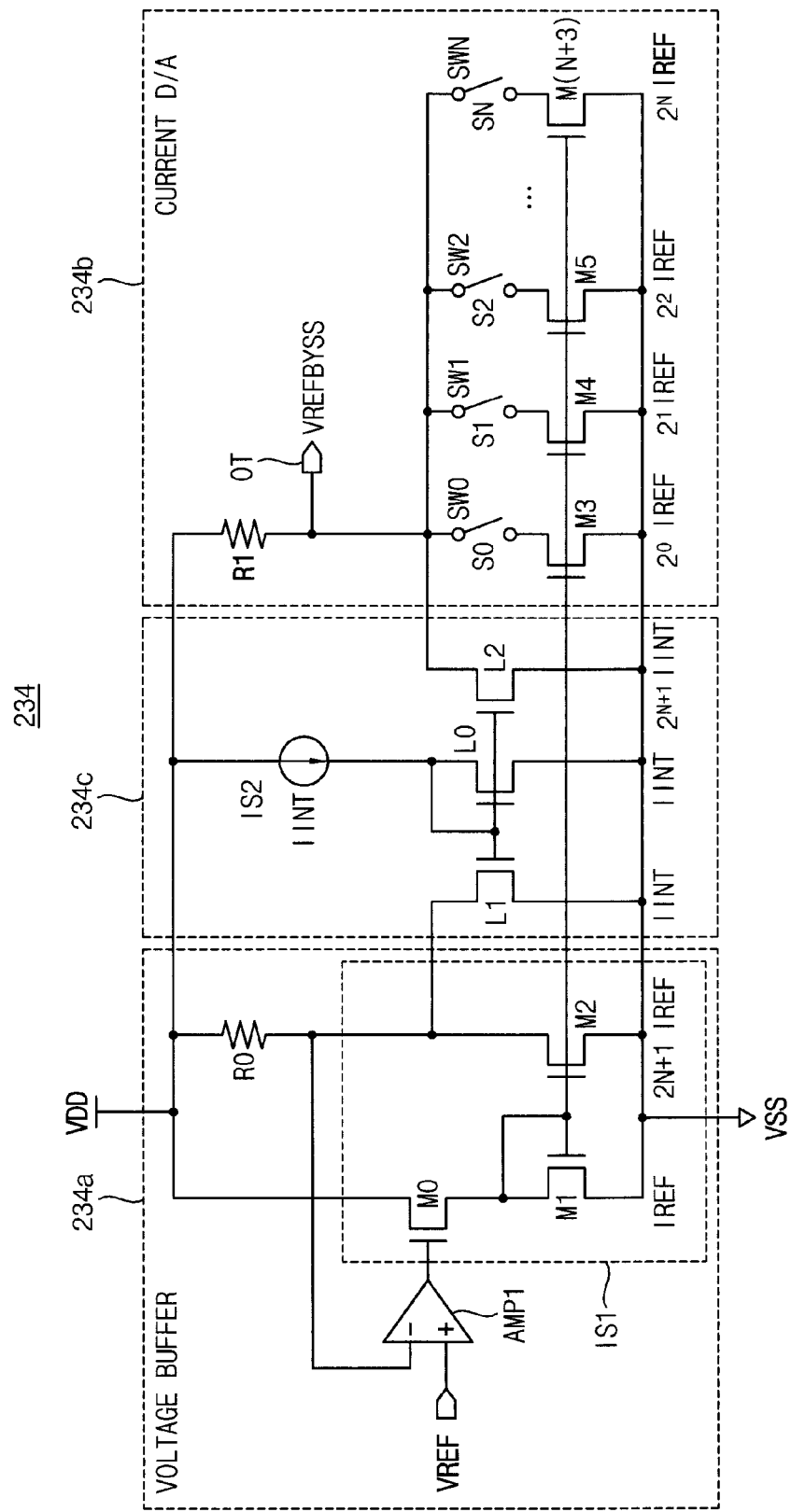
FIG. 10 is a detailed circuit diagram illustrating the ramp circuit of FIG. 7 according to another example embodiment.
Figure 11:
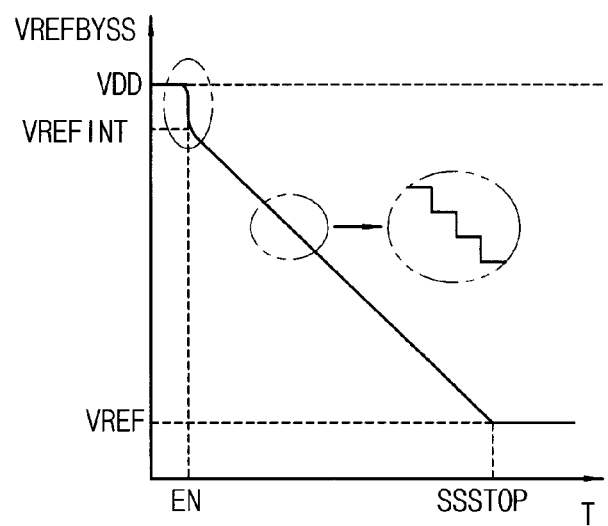
FIG. 11 is a graph illustrating the output characteristic of the ramp circuit of FIG. 10.

FIG. 10 is a detailed circuit diagram illustrating the ramp circuit of FIG. 7 according to another embodiment of the present inventive concepts, and FIG. 11 is a graph illustrating the output characteristic of the ramp circuit of FIG. 10.

In another embodiment, the ramp circuit 234 further includes an initial down current source 234*c*. The initial down current source 234*c* includes a current source IS2 and NMOS transistors L0, L1 and L2. The current source IS2 and the NMOS transistor L0 are connected in series between the high level power supply voltage VDD and the low level power supply voltage VSS. The gate of the NMOS transistor L0 is connected to the drain so as to be configured in a diode configuration. The gate of the NMOS transistor L1 is connected to the gate of the NMOS transistor L0. The source of the NMOS transistor L1 is connected to the VSS power voltage and the drain is connected to the negative feedback terminal of the differential amplifier AMP1. The source of the NMOS transistor L2 is connected to the VSS power voltage and the drain is connected to the output terminal OT. The gate of the NMOS transistor L2 is connected to the gate of the NMOS transistor L0.

In some embodiments, the NMOS transistor L1 is arranged to have the same aspect ratio as that of the NMOS transistor L0. In some embodiments, the aspect ratio of the NMOS transistor L2 is made to be $2^{N+1}$ times larger than the aspect ratio of the NMOS transistor L0. Accordingly, the NMOS transistor L2 has a current sinking ability of $2^{N+1}$IINT, which is $2^{N+1}$ times greater than the current IINT set by the current source IS2.

In accordance with another embodiment, when the reference voltage VREF is at the level VDD and the output voltage VOUT of the converter 20 is 0 [V] or above, the freewheeling diode may cause a malfunction during an initialization stage of the power supply. Thus, in order to accelerate an early down speed aside from a soft-start current in the initialization stage of power supply, an additional current sink path can be provided through the NMOS transistor L2, as shown in FIG. 10, so that, during this initialization time period, the ramp-down slope is relatively steeply declined in rapid form. That is, the initial down current source 234*c* provides an initial down current to the current DA 234*b* in order to accelerate an initial ramp-down when a base level of the soft-start reference voltage VREFBYSS is the high voltage level VDD and an output voltage VOUT of the DC-DC converter 20 is positive.

Referring to FIG. 11, the base level of the soft-start reference voltage VREFBYSS is rapidly lowered down from VDD level to an initial reference voltage VREFINT when the power is initially applied, and then the soft-start reference voltage VREFBYSS is ramped down, in a substantially linear manner, from the initial reference voltage VREFINT to the reference voltage VREF level.

Figure 12:
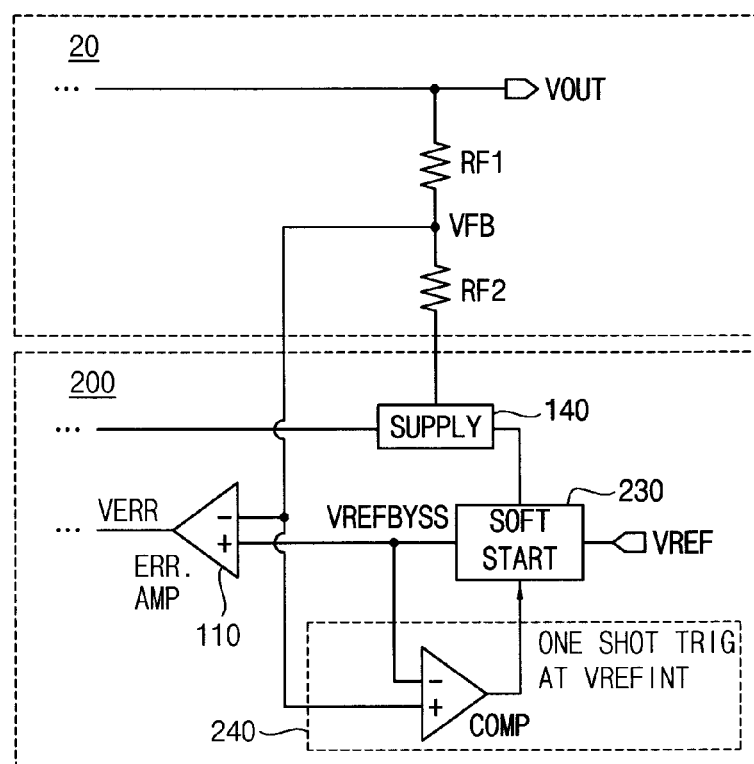
FIG. 12 is a detailed circuit diagram illustrating the ramp circuit of FIG. 7 according to still another example embodiment.
Figure 13:
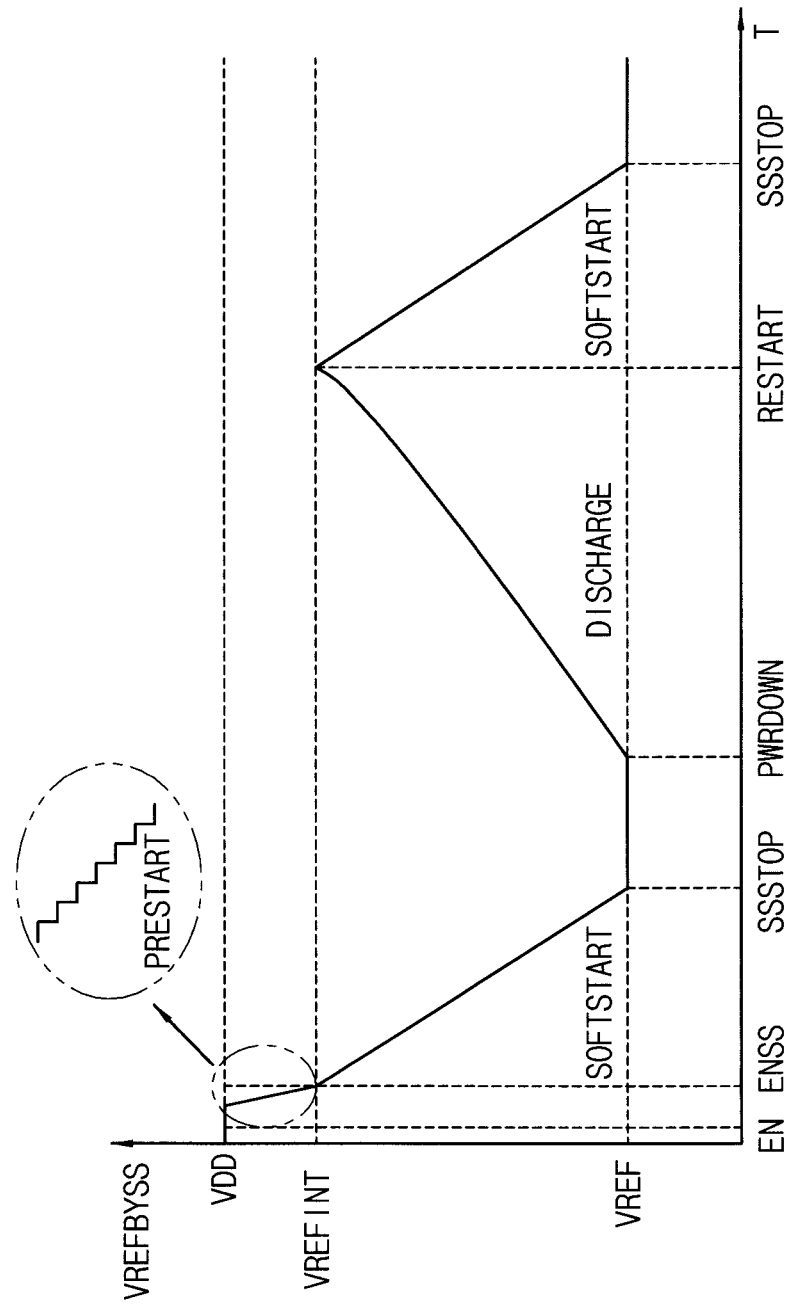
FIG. 13 is a graph showing the output characteristic of the ramp circuit of FIG. 12.

FIG. 12 is a detailed circuit diagram illustrating the ramp circuit of FIG. 7 according to another embodiment of the present inventive concepts, and FIG. 13 is a graph showing the output characteristic of the ramp circuit of FIG. 12.

According to the embodiment of FIGS. 11 and 12, the power management integrated circuit device 200 further includes a comparator 240 for a case where the starting voltage point is variable. The comparator 240 compares the soft-start reference voltage VREFBYSS with the feedback voltage VFB fed back from the output terminal of the DC-DC converter, thereby generating an initial reference voltage VREFINT. The initial reference voltage VREFINT is applied to the clock-based soft-start circuit 230. That is, the start point may be found by performing the ramp-down in a manner that is faster than the soft start when the pre-start is performed through the comparator 240.

Referring to FIG. 13, during pre-start, the base level of the soft-start reference voltage VREFBYSS is lowered down from VDD level to an initial reference voltage VREFINT when the power is applied. and then the soft-start reference voltage VREFBYSS is ramped down, in a substantially linear manner, from the initial reference voltage VREFINT to the reference voltage VREF level. When the clock-based soft start circuit 230 in FIG. 12 is restarted, the soft-start reference voltage VREFBYSS is ramped down, in a substantially linear manner, from the initial reference voltage VREFINT.

Further, in some embodiments, a register can be provided in the clock-based soft-start circuit 230 to store the pre-start point therein. As shown in FIG. 12, when a restart is performed in at a later time, the soft-start may be instantly performed without the need for a pre-start operation. In this case, the initial start time period may be avoided and the amount of inrush current can be minimized since the ramp-down slope may be optimized each time.

Even though the integrated circuit according to example embodiments of the present inventive concept is described while specifying the number of NMOS transistors, PMOS transistors, dividers, counters, flip-flops, and logic circuits for the purpose of convenience of description, it may be understood that the number of NMOS transistors, PMOS transistors, dividers, counters, flip-flops, and logic circuits may be increased or decreased such that the integrated circuit can be used in various display power supplies without any additional circuits by generating the soft-start reference voltage with linear ramp-up/down in response to a clock signal within the scope of the present inventive concepts. Although the inverting and non-inverting DC-DC converters are described by way of examples for the purpose of convenience of description, example embodiments may also be applicable for an inductor circuit to minimize an inrush current in an initial stage of power supply.

Example embodiments may be advantageously employed for a display power supply, and, particularly, may be more advantageously employed for electric and electronic devices, including portable devices, and systems to which efficient power management is requested.

The foregoing is illustrative of example embodiments and is not to be construed as limiting thereof. Although a few example embodiments have been described, those skilled in the art will readily appreciate that many modifications are possible in the exemplary embodiments without materially departing from the novel teachings and advantages of the present inventive concepts. Accordingly, all such modifications are intended to be included within the scope of the present inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A clock-based soft-start circuit configured to generate a soft-start reference voltage that restrains an inrush current at an initialization of power supplied to a DC-DC converter, the clock-based soft-start circuit comprising:
    a time setting unit configured to set a soft-start time period in response to a clock signal; and
    a ramp circuit configured to generate a soft-start reference voltage which is ramped upward or downward between a base level and a reference voltage level during the soft start time period set by the time setting unit,
    wherein the time setting unit comprises:
        a counter to which a delayed clock signal is input, the counter configured to count the soft-start time period; and
        a soft-start time stopper configured to shut off the input of the delayed clock signal to the counter when the soft-start time period has been reached.

2. The clock-based soft-start circuit of claim 1, wherein the ramp circuit comprises:
    a voltage buffer configured to generate a reference current in response to a reference voltage applied to an input of the voltage buffer; and
    a current digital-to-analog converter configured to generate a ramp current which is ramped upward or downward in units of the reference current in response to an output of the counter, and configured to convert the ramp current into a ramp voltage to output the soft-start reference voltage.

3. The clock-based soft-start circuit of claim 2, wherein the voltage buffer comprises:
    a differential amplifier configured to differentially amplify the reference voltage and a first feedback voltage; and
    a reference current source configured to generate the reference current in response to an output of the differential amplifier,
    the first feedback voltage being provided from the reference current source to the differential amplifier in response to the reference current.

4. The clock-based soft-start circuit of claim 2, wherein the current digital-to-analog converter comprises:
    a plurality of current sources, each of which generates a mutually-different current as a multiple of two relative to, and in response to, the reference current;
    a plurality of switches, each connected to a respective one of the current sources, the switches corresponding to a plurality of binary outputs of the counter, respectively, each of the plurality of switches being activated in response to a corresponding output; and
    an output unit that receives the mutually-different currents, which are supplied through the switches, to generate the soft-start reference voltage.

5. The clock-based soft-start circuit of claim 4, wherein the DC-DC converter is a non-inverting type, and wherein each of the plurality of current sources includes PMOS transistors which have mutually-different aspect ratios as a multiple of two, and is ramped up from a zero voltage level serving as the base level.

6. The clock-based soft-start circuit of claim 4, wherein the DC-DC converter is an inverting type, and wherein each of the plurality of current sources includes NMOS transistors which have mutually-different aspect ratios as a multiply of two, and is ramped down from a high voltage level serving as the base level.

7. The clock-based soft-start circuit of claim 4, further comprising an initial down current source configured to provide an initial down current to the output unit for accelerating an initial ramp-down when the base level is the high voltage level and an output voltage of the DC-DC converter is positive.

8. The clock-based soft-start circuit of claim 7, further comprising a comparator that compares the soft-start reference voltage with a second feedback voltage from an output terminal of the DC-DC converter to generate an initial reference voltage.

9. A power management integrated circuit device comprising:
- an error amplifier configured to compare a reference voltage with a feedback voltage generated by dividing an output voltage of a DC-DC converter, to generate an error voltage;
- a pulse width controller configured to generate a pulse-width control signal of a switching device of the DC-DC converter in response to the error voltage; and
- a clock-based soft-start circuit configured to generate a soft-start reference voltage which is ramped up or down in response to a clock signal when power is initially supplied,
- wherein the clock-based soft-start circuit comprises a time setting unit configured to set a soft-start time period in response to the clock signal, and
- wherein the time setting unit comprises:
- a counter to which a delayed clock signal is input, the counter configured to count the soft-start time period; and
- a soft-start time stopper configured to shut off the input of the delayed clock signal to the counter when the soft-start time period has been reached.

10. The power management integrated circuit device of claim 9, wherein the DC-DC converter is a non-inverting type, and wherein the clock-based soft-start circuit includes PMOS transistors, each transistor sequentially generating a mutually-different current as a multiple of two relative to, and in response to, a reference current for ramping up the soft-start reference voltage from a base level in a substantially linear manner.

11. The power management integrated circuit device of claim 9, wherein the DC-DC converter is an inverting type, and wherein the clock-based soft-start circuit includes a plurality of NMOS transistors, each transistor for sequentially generating a mutually-different current as a multiple of two relative to, and in response to, a reference current for ramping down the soft-start reference voltage from a base level in a substantially linear manner.

12. The power management integrated circuit device of claim 11, wherein the clock-based soft-start circuit further includes an initial down current source configured to provide an initial down current to accelerate an initial ramp-down when the base level is a high voltage level and an output voltage of the DC-DC converter is positive.

13. The power management integrated circuit device of claim 9, further comprising a comparator configured to compare the feedback voltage fed back from the output terminal of the DC-DC converter with the soft-start reference voltage to generate an initial reference voltage.

14. A clock-based soft-start circuit in a DC-to-DC converter, comprising:
- a time setting unit configured to set a soft-start time period in response to the clock signal and comprising a binary counter that is activated to count clock cycles during a soft-start time period, the binary counter having a plurality of output bits corresponding to binary values; and
- a ramp circuit that generates a soft-start reference voltage that ramps upward or downward in response to the plurality of output bits of the binary counter, the ramp circuit including a plurality of transistors having current driving parameters that correspond to binary values, current paths of the plurality of transistors being activated in response to the plurality of output bits of the binary counter,
- wherein the time setting unit comprises:
- the binary counter to which a delayed clock signal is input, the binary counter configured to count the soft-start time period; and
- a soft-start time stopper configured to shut off the input of the delayed clock signal to the binary counter when the soft-start time period has been reached.

15. The clock-based soft-start circuit of claim 14 further comprising an output unit that combines a plurality of currents flowing through the current paths of activated ones of the plurality of transistors to generate a combined current and that converts the combined current to the soft-start reference voltage.

16. The clock-based soft-start circuit of claim 14 further comprising a plurality of switches that selectively activate the plurality of current paths in response to states of the plurality of output bits of the binary counter.

17. The clock-based soft-start circuit of claim 14 wherein the transistors are PMOS or NMOS transistors.

18. The clock-based soft-start circuit of claim 14 wherein the soft-start reference voltage ramps upward or downward in a substantially linear manner.

19. The clock-based soft-start circuit of claim 14 wherein the binary counter is selectively activated over the soft-start time period during which the soft-start reference voltage ramps upward or downward between a base level and a reference voltage level.

* * * * *